United States Patent [19]

Cistero

[11] Patent Number: 4,746,291

[45] Date of Patent: May 24, 1988

[54] BAKERY AND PASTRY OVEN

[75] Inventor: Jose L. Cistero, San Sebastian Guipuzcoa, Spain

[73] Assignee: Industrial Salva, S.A., Guipuzcoa, Spain

[21] Appl. No.: 78,529

[22] Filed: Jul. 28, 1987

[30] Foreign Application Priority Data

May 21, 1987 [ES] Spain .................................. 8701700

[51] Int. Cl.$^{4}$ ............................................... F27D 3/12

[52] U.S. Cl. ..................................... 432/241; 104/91; 104/94; 104/95

[58] Field of Search ............... 432/121, 234, 243, 123, 432/124, 131, 137, 141, 142, 241, 239; 104/35, 89, 91, 94, 99, 135, 137, 307, 168; 198/465.4, 412

[56] References Cited

U.S. PATENT DOCUMENTS

| | | | |
|---|---|---|---|
| 3,422,769 | 1/1969 | Sims | 104/99 |
| 3,595,178 | 7/1971 | Dablen | 432/241 |
| 3,613,600 | 10/1971 | Pettit | 104/91 |
| 4,027,596 | 6/1977 | Nardozzi, Jr. | 104/35 |
| 4,122,778 | 10/1978 | DiRosa | 104/94 |
| 4,614,158 | 9/1986 | Helde | 104/91 |

*Primary Examiner*—Henry C. Yuen

*Attorney, Agent, or Firm*—Helfgott & Karas

[57] ABSTRACT

The present invention relates to a bakery and pastry oven, of the type which is capable of receiving therein a tray-carrying truck, and of subjecting the said truck to a rotatory motion during the cooking process, which oven has been substantially improved in order to achieve, on the one hand, a greater capacity or useful space inside the said oven, and, on the other, the possibility of coupling trucks of varying sizes to the rotating means.

1 Claim, 1 Drawing Sheet

BAKERY AND PASTRY OVEN

BACKGROUND OF THE INVENTION

It is desirable, in the cooking process of certain food products, such as, for example, bakery products and pastries, to subject such products to a rotatory motion within the oven, in order that they may receive the heat uniformly and thus achieve a more homogenous cooking thereof.

In this sense, there are known ovens having a tray-carrying truck as an auxiliary element, in the trays whereof are placed the products to be cooked, the said truck being slidable to facilitate transport thereof, the oven including on its ceiling or upper walls suspension means for the said truck, which suspension means are further driven by a motor, such that once the tray-carrying truck has been duly established within the oven it is subjected to a constant rotatory motion during the cooking process.

One of such ovens is described, for example, in U.S. Pat. No. 3,595,178, priority of 1967.

The said U.S. patent specifically describes an oven having on its ceiling a rotating platform related to the shaft of a motor-reducer group, which platform is provided with bent flanges at its opposite edges, wherein are established respective pairs of rollers on which slide angular profiles which emerge upwards from the tray-carrying truck, such that this latter is suspended from the upper, rotating platform of the oven through the said angular profiles which rest on the said rollers, the rollers furthermore resulting in the elevation of the truck from the floor or base of the oven on being introduced thereinto, said truck thus being free to rotate on being dragged by the rotating platform.

Such a solution, though acceptable from an operative point of view, has, in practice, two important problems, first of all the means for receiving and suspending the tray-carrying truck considerably reduce the height of the oven chamber, in an amount of some 10 cm, wherefore a different solution would allow, in a certain type of oven, the use of a truck carrying one more tray. Furthermore, and likewise in accordance with the structure described, each oven may only receive a certain type of tray-carrying truck, thereby lacking the functional versatility which would allow the use of different sized trucks, this being necessary in many cases where different types of bakery products are manufactured in the same establishment.

Along these same lines is Spanish Utility Model No. 198.453 which, based on the same functional structure as the previously-described oven, has certain modifications basically centred in the substitution of the mentioned upper rotating platform for a hooked element which also allows the substitution of the previously-mentioned set of four rollers for a single roller, although in this case, and in order to prevent sideways balancing of the tray-carrying truck, a rotating guide to which may be coupled a shaft emerging vertically and centrally from the lower base of the tray-carrying truck must be provided on the floor or base of the oven. This solution simplifies the upper suspension means for the tray-carrying tuck, at the expense of a more complex lower part of the oven due to the presence of the said rotating guide, not provided in U.S. Pat. No. 3,595,178 mentioned before, and furthermore fails to solve the problems of the said patent, for the said suspension means for the tray-carrying truck are established between the top of the oven and the upper surface of the truck, thus taking up a considerable amount of space.

DESCRIPTION OF THE INVENTION

The improvements introduced into a bakery and pastry oven of this type, and on which are centred the objectives of the present invention, fully solve the mentioned problems, allowing, on the one hand, and as aforesaid, a greater size and height of the tray-carrying truck for an oven of specific dimensions, due to the special structure and arrangement of the suspension means therefor, and also the possibility of using different-sized tray-carrying trucks in one same oven.

More specifically, and in order to achieve the above, the invention is centred on the fact that the sliding blocks which the tray-carrying truck must inevitably include for sliding on the rollers of the upper platform of the oven suspension means, are not located on the upper surface of the said truck, as in the previously mentioned registrations, and as is conventional, but on the opposing side walls of the truck.

In this way, the rotating platform, which is of reduced thickness, may adopt a position of maximum proximity to the ceiling of the oven, the tray-carrying truck being in turn considerably close to the platform, thus making the most of the space available.

This obviously means that the platform must be larger than the truck, in order that the supporting rollers are not established on the base thereof, but rather laterally with respect thereto.

In accordance with a further characteristic of the invention, the said rollers are mounted, free to rotate, on angular supports which constitute physically independent parts of the platform and which are fitted thereto with the aid of screws which play within slit holes, such that the position of said angular support may be adjusted with respect to relative separation thereof, and thus likewise allowing the adjustment of the distance between the two pairs of rollers, thereby allowing coupling thereonto of tray-carrying trucks of varying sizes.

Finally, and as a further characteristic of the invention, it has been foreseen that the side sliding blocks through which the tray-carrying truck rests on the said rollers, in addition to defining a slope or inclined plane, such that on frontally pushing the truck within the oven it is raised and separated from the floor of the oven, further include a curved section at their ends, the concave part thereof facing downwards, on which rest the rear pair of rollers, thereby automatically achieving stable seating of the tray-carrying truck when same is fully introduced within the oven.

DESCRIPTION OF THE DRAWINGS

In order to complete the description being made, and to assist the better understanding of the characteristics of the invention, a single page of drawings is attached to the present specification, as an integral part thereof, wherein the following has been shown in an illustrative and non limiting manner.

PREFERRED EMBODIMENT OF THE INVENTION

Figure 1:
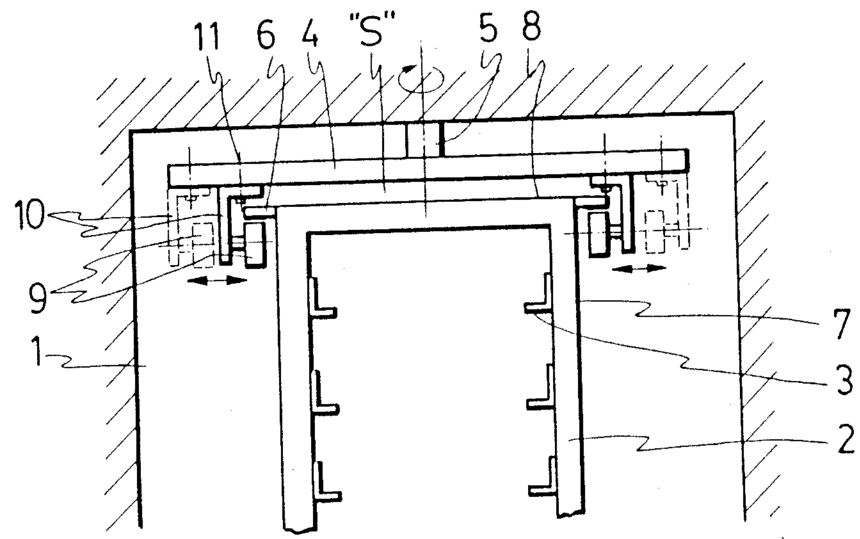
FIG. 1 is a partial front view of a bakery and pastry oven in accordance with the improvements object of the present invention, showing, in continuous and dotted lines, the extreme positions of the rollers related to the rotating platform which allow the housing of different sized trucks within the oven.

In the light of the preceding figures, it can be seen how, in the oven being described, there is established, as in any conventional oven of this type, a cooking chamber 1 for housing a truck 2 provided with means 3 for supporting a plurality of trays at varying heights, the said truck being designed to be housed within chamber 1 and suspended from a rotating platform 4 driven through shaft 5 by a motor-reducer group, not shown in the figures and established on the oven itself.

From the said basic structure, the improvements of the invention are centred on the fact that sliding blocks 6, integral with truck 2 and through which the said truck couples onto rotating platform 4, are established on side walls 7 of the said truck and are comprised by simple plates, as compared to the conventional solutions wherein the said sliding blocks were defined in the upper section of bent flanges provided on the upper surface of the said truck. In this way, there is a minimum space "S" between platform 4 and the upper surface 8 of truck 2 when this latter is duly coupled, thus resulting in a greater loading capacity for truck 2, and furthermore, in the possibility of placing an additional tray thereon for an oven 1 of given dimensions.

Furthermore, conventional rollers 9 on which rest sliding blocks 6 are integral with angular supports 10 which are physically independent from the rotating platform 4 and which are fitted thereto with the aid of screws 11 which play within slit holes, thus allowing adjustment of the distance between the said supports, and specifically between the extreme positions shown in continuous and dotted lines in FIG. 1, which is equivalent to allowing that one same oven having a specific structure for rotating platform 4 may receive different sized tray-carrying trucks 2 simply by adjusting the said supports to meet the requirements of each particular truck.

Figure 2:
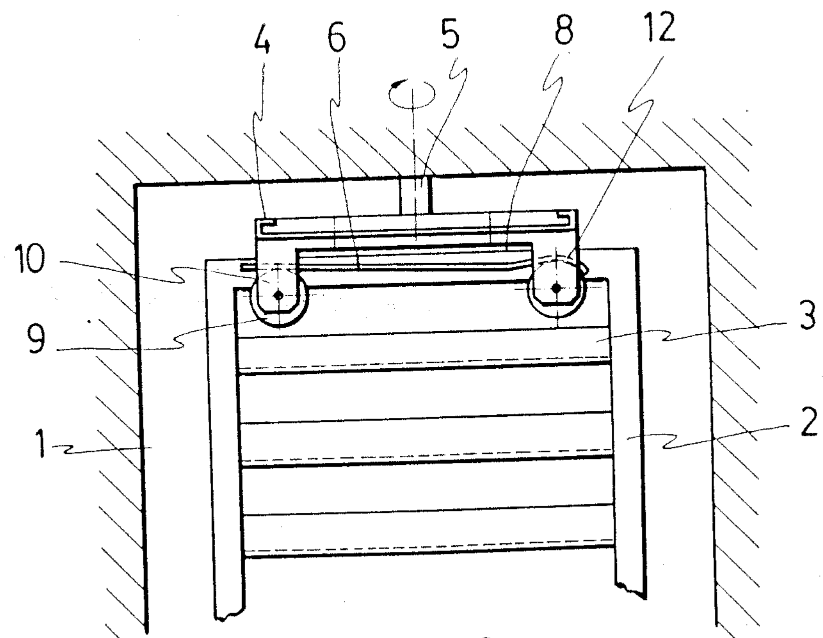
FIG. 2 is the same partial view as in the preceding figure, wherein the upper rotating platform and the truck related thereto have rotated through 90°.

Referring once again to sliding blocks 6, and as shown in FIG. 2, the said blocks have a wide section, corresponding to reference 6 itself, defining an inclined plane or slope in order that the truck may be raised on being pushed for introduction within the oven, and an arcuate end section 12, the concavity facing downwards, wherein there is established a stable extreme position, between the said blocks and the corresponding rollers 9, when the truck has been fully introduced into the oven 1, i.e., on pushing the said truck 2, same is gradually raised to an extreme position wherein it descends slightly, automatically coupling to rollers 9 near the oven doors in the curvatures of the corresponding arcuate sections of the block, clearly defining the full introduction of the truck and rendering same perfectly stable in said position with respect to said rollers, on resting thereon through the opposed inclined planes.

There is thus provided, in accordance with the objectives of the invention, and as shown specifically in FIG. 1, an oven with maximum use of its cooking chamber 1, i.e., an oven which is capable of housing higher trucks than are conventional ovens of the same size, which is further capable of housing therein tray-carrying trucks of different widths, being easily adapted to the requirements of each specific case, and which, finally, and as shown in FIG. 2, is provided with means for affording automatic stability of the said truck after introduction thereof within the oven.

It is not considered necessary to extend the present description any further for an expert in the art to understand the scope of the invention and the advantages derived therefrom.

The materials, shape, size and arrangement of the elements may vary, provided this does not imply a modification in the essentiality of the invention.

The terms used to describe the present specification should be understood to have a wide and non limiting meaning.

We claim:

1. Improved bakery and pastry oven which, being of the type which includes, on the upper surface of its cooking chamber, a rotating platform driven by a motor-reducer group, to which may be coupled, suspended therefrom, a tray-carrying truck provided with blocks for sliding on a set of rollers which are related to the said rotating platform, is essentially characterised in that the said sliding blocks are located on the side walls of the truck structure, such that in its coupled position the upper surface of the said truck is notably close to the rotating platform, thereby making the most of the useful capacity of the oven cooking chamber, the rollers on which slide the mentioned blocks being in turn located on angular supports which constitute physically independent elements from the rotating platform, the said supports being fitted to the platform with the aid of screws which play within slit holes, such that the said slit holes allow, prior to tightening of the said screws, the adjustment of the distance between the said angular supports, in order that the rotating platform assembly may be capable of receiving tray-carrying trucks of varying width, adjusting exactly to the dimensional requirements thereof, it having been further foreseen that the said blocks, in addition to defining the conventional slope or inclined plane for the transversal displacement and simultaneous elevation of the said truck on the rollers of the rotating platform, include respective arcuate sections at their ends, each section having a downwardly facing concavity therein, wherein are automatically housed the corresponding rollers in the fully introduced position of the tray-carrying truck within the oven.

* * * * *